United States Patent
Mori et al.

(10) Patent No.: US 11,543,056 B2
(45) Date of Patent: Jan. 3, 2023

(54) TUBE

(71) Applicant: Hitachi Metals, Ltd., Tokyo (JP)

(72) Inventors: Masahiro Mori, Tokyo (JP); Yoshinori Yoshida, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 683 days.

(21) Appl. No.: 16/481,890

(22) PCT Filed: Feb. 5, 2018

(86) PCT No.: PCT/JP2018/003827
§ 371 (c)(1),
(2) Date: Jul. 30, 2019

(87) PCT Pub. No.: WO2018/143457
PCT Pub. Date: Aug. 9, 2018

(65) Prior Publication Data
US 2019/0390800 A1 Dec. 26, 2019

(30) Foreign Application Priority Data
Feb. 6, 2017 (JP) .............................. JP2017-019300

(51) Int. Cl.
*F16L 11/15* (2006.01)
*D04C 1/02* (2006.01)
*D04C 1/06* (2006.01)

(52) U.S. Cl.
CPC ................. *F16L 11/15* (2013.01); *D04C 1/02* (2013.01); *D04C 1/06* (2013.01)

(58) Field of Classification Search
CPC .............. F16L 11/15; D04C 1/02; D04C 1/06
USPC .......................................................... 138/121
See application file for complete search history.

(56) References Cited

U.S. PATENT DOCUMENTS

| | | |
|---|---|---|
| 8,399,767 B2 | 3/2013 | Duquette et al. |
| 8,905,083 B2 | 12/2014 | Strunk |
| 9,249,904 B2 | 2/2016 | Duquette et al. |
| 2007/0012472 A1 | 1/2007 | Goodson |
| 2009/0114304 A1 | 5/2009 | Mohri et al. |
| 2009/0283287 A1 | 11/2009 | Goodson |
| 2010/0013406 A1 | 1/2010 | Bhattacharya |

(Continued)

FOREIGN PATENT DOCUMENTS

| | | |
|---|---|---|
| CN | 1906439 A | 1/2007 |
| CN | 101952495 A | 1/2011 |

(Continued)

OTHER PUBLICATIONS

First Search Report dated Sep. 25, 2020, of counterpart Chinese Application No. 201880009757.3.

(Continued)

*Primary Examiner* — Craig M Schneider
*Assistant Examiner* — David R Deal
(74) *Attorney, Agent, or Firm* — DLA Piper LLP (US)

(57) ABSTRACT

A tube includes a corrugated metal tubular member; and a first covering part that covers the outside of the tubular member, and forms a braided structure using a resin string member of which at least a part is covered by a metal having lower electrical resistance than that of a metal forming the tubular member. The tube can also include a third covering part made of an insulating resin arranged between the tubular member and the first covering part, and covers the tubular member, wherein the first covering part covers the third covering part.

6 Claims, 5 Drawing Sheets

(56) References Cited

U.S. PATENT DOCUMENTS

2011/0041944 A1   2/2011   Duquette et al.
2011/0042139 A1   2/2011   Duquette et al.
2013/0192708 A1   8/2013   Strunk

FOREIGN PATENT DOCUMENTS

| CN | 203223656 U    | 10/2013 |
| JP | S47-8904       | 4/1972  |
| JP | H06-159558 A   | 6/1994  |
| JP | 2002-174374 A  | 6/2002  |
| JP | 2003-083482 A  | 3/2003  |
| JP | 2003-083483 A  | 3/2003  |
| JP | 2005-308210 A  | 11/2005 |
| JP | 2007-155084 A  | 6/2007  |
| JP | 2008-256108 A  | 10/2008 |
| JP | 2014-114525 A  | 6/2014  |
| WO | 2005/093307 A1 | 10/2005 |
| WO | 2009/095941 A1 | 8/2009  |
| WO | 2013/051571 A1 | 4/2013  |
| WO | 2013/112213 A1 | 8/2013  |

OTHER PUBLICATIONS

The Extended European Search Report dated Nov. 16, 2020, of counterpart European Application No. 18747428.3.
Notice for Reasons for Refusal dated May 10, 2022, of counterpart Japanese Patent Application No. 2018-566155, along with an English Translation.

TUBE

TECHNICAL FIELD

This disclosure relates to a tube including a corrugated metal tubular member.

BACKGROUND

A tube including a corrugated metal tubular member is sometimes used as a tube through which fluid such as gas or water used in a home flows. Such a tube arranged in a home may be damaged due to spark discharge generated by induced lightning that intrudes to the home through a wire or the like.

JP 2005-308210 A discloses a tube including a metal layer formed of a metal foil of a copper, an aluminum or the like, and has thickness continuing uniformly, in the outside of a resin layer covering a corrugated tubular member, or in between the tubular member and the resin layer. In the use of that tube, the metal layer is connected to a tube joint included in a piping system connected to a ground electrode, and is grounded via the tube joint. Accordingly, when a spark discharge occurs for the tube from a steel frame or the like due to induced lightning, the spark discharge occurs not toward the tubular member, but toward the metal layer. A current generated by the spark discharge flows not through the tubular member but through the metal layer to be released to the ground. However, in such a tube, when the metal layer is thin, a large part of the metal layer may be burned out by the spark discharge due to a single induced lightning occurrence, and a function of releasing a large current due to induced lightning thereafter to the ground not through the tubular member may be lost. When the metal layer is made thick so that the function of releasing a large current to the ground not through the tubular member is maintained for spark discharge due to multiple induced lightning occurrences, flexibility of the tube may be lost. To solve such a problem, a solution of both maintaining of a function of releasing a large current to the ground not through the tubular member for spark discharge due to multiple induced lightning occurrences, and maintaining flexibility in the tube has been desired.

SUMMARY

We thus provide:

(1) The tube includes: a corrugated metal tubular member; and a first covering part that covers the outside of the tubular member, and forms a braided structure using a resin string member of which at least a part is covered by a metal having lower electrical resistance than that of a metal forming the tubular member. The first covering part forming the braided structure is formed by braiding multiple independent string members, and a range of burning out is hard to expand radially. Since all the string members never be burned out at one time, as compared to a configuration in which a range of burning out may expand radially and uniformly, for example, a configuration in which a covering part is formed of a metal layer having thickness continuing uniformly, the first covering part is hard to be burned out over a wide range. Therefore, a function of releasing a large current to the ground not through the tubular member for spark discharge due to multiple induced lightning occurrences is easy to be maintained. Since the first covering part forming the braided structure is excellent in bendability and stretchability compared to a metal layer having thickness continuing uniformly, flexibility in the tube is easy to be maintained. Accordingly, both maintaining of the function of releasing a large current to the ground not through the tubular member for spark discharge due to multiple induced lightning occurrences, and maintaining of flexibility in the tube can be achieved.

(2) The tube also includes: a corrugated metal tubular member; and a second covering part that covers an outside of the tubular member, and forms a braided structure using a metal string member having lower electrical resistance than electrical resistance of a metal forming the tubular member in at least a part of the braided structure. According to this aspect, a second covering part forming a braided structure is formed by braiding multiple independent string members, and a range of burning out is hard to expand radially. Since all the string members never be burned out at one time, compared to a configuration in which a range of burning out may expand radially and uniformly, for example, a configuration in which a covering part is formed of a metal layer having thickness continuing uniformly, the second covering part is hard to be burned out over a wide range. Therefore, a function of releasing a large current to the ground not through the tubular member for spark discharge due to multiple induced lightning is easy to be maintained. Since the second covering part forming the braided structure is excellent in bendability and stretchability as compared to a metal layer having thickness continuing uniformly, flexibility in the tube is easy to be maintained. Accordingly, maintaining the function of releasing a large current to the ground not through the tubular member for spark discharge due to multiple induced lightning occurrences, and maintaining of flexibility in the tube can be both achieved.

(3) The tube may further include a third covering part formed of an insulating resin that is arranged between the tubular member and the first covering part to cover the tubular member, and the first covering part may cover the third covering part. The third covering part formed of the resin is arranged between the tubular member and the first covering part so that the tubular member and a metal portion of the first covering part do not contact with each other, and therefore, the tubular member and the first covering part are electrically insulated. Accordingly, it is possible to prevent a current from flowing via the first covering part to the tubular member.

(4) The tube may further include a third covering part made of an insulating resin that is arranged between the tubular member and the second covering part, and covers the tubular member, and the second covering part may cover the third covering part. The third covering part formed of the resin is arranged between the tubular member and the second covering part so that the tubular member and a metal portion of the second covering part do not contact with each other, and the tubular member and the second covering part are electrically insulated. Accordingly, it is possible to prevent a current from flowing via the second covering part to the tubular member.

(5) The string member in the first covering part may be covered by winding a metal foil having lower electrical resistance than electrical resistance of a metal forming the tubular member. It is possible to prevent the metal covering the string member formed of a resin from hindering the stretch in the string member formed of a resin in an axis direction.

This disclosure not limited to a tube, and may be applied to, for example, various aspects such as a gas supply device having a tube, a water supply device having a tube, or a manufacturing method of a tube. Furthermore, this disclosure is not limited to the aspects describe above at all, and of course may be performed in various aspects within a scope not departing from the spirit of the amended claims.

REFERENCE SIGNS LIST

Figure 1:
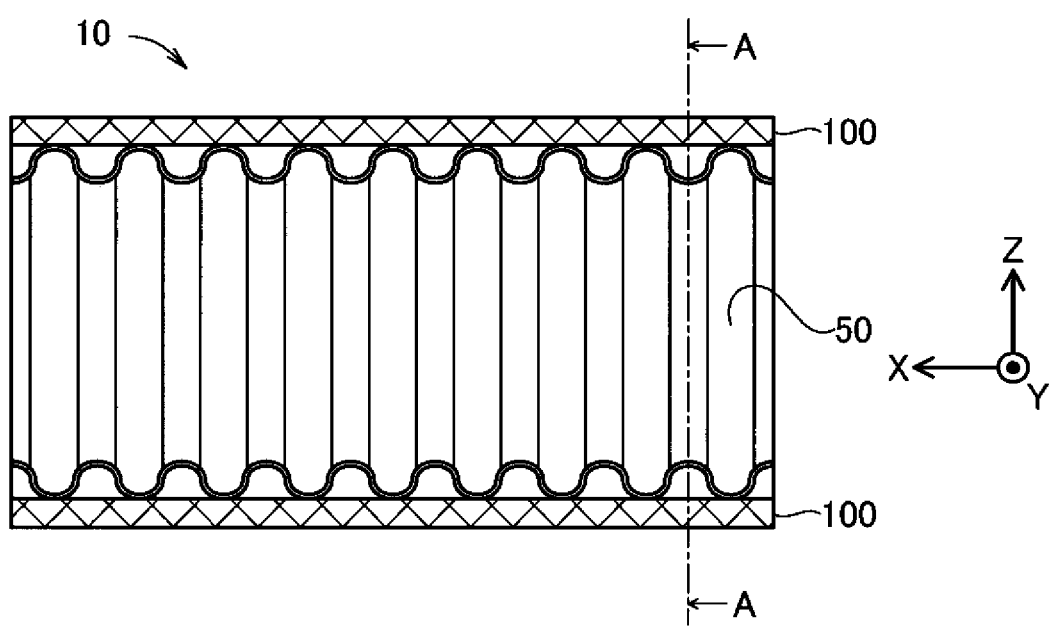
FIG. 1 is an explanatory diagram showing a configuration of a tube in a first example.

10 Tube
10a Tube
50 Tubular member
100 First covering part
110 String member
200 Second covering part
210 String member
220 String member
300 Third covering part

DETAILED DESCRIPTION

A. First Example

Figure 2:
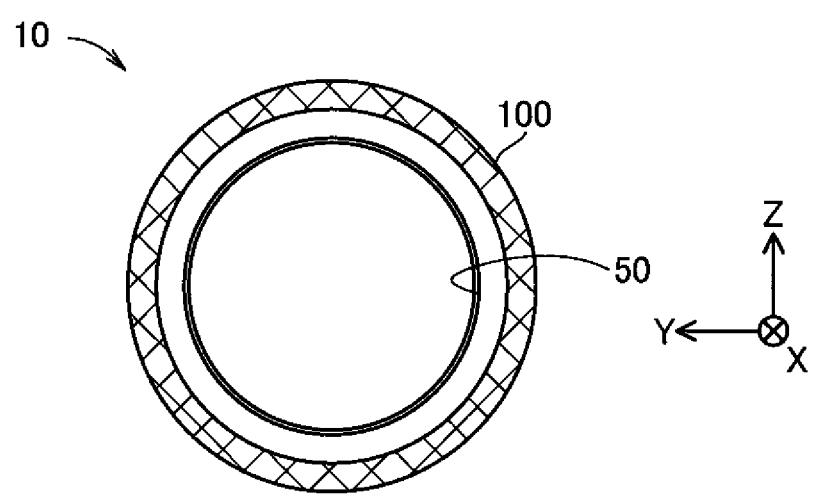
FIG. 2 is a cross-sectional view of the tube in FIG. 1 viewed from arrows A-A.

FIG. 1 is a cross-sectional view showing a configuration of a tube 10 in a first example. FIG. 1 illustrates X, Y, and Z axes orthogonal to each other. The X axis in FIG. 1 is set to parallel with an axis line (not shown) of the tube 10 in a non-flexed state. The X, Y, and Z axes in FIG. 1 correspond to X, Y, and Z axes in other drawings. FIG. 1 is a cross-sectional view of the tube 10 taken along a surface including a central axis line. For convenience of illustration, FIG. 1 shows only a part along the X axis direction of the tube 10. FIG. 2 is a cross-sectional view of the tube 10 in FIG. 1 viewed from arrows A-A.

The tube 10 is a tube through which fluid such as gas or water used in a home flows. The tube 10 is grounded. The tube 10 includes a tubular member 50 and a first covering part 100.

The tubular member 50 is a corrugated stainless-steel tubular member. The corrugating is processing of shaping a circumferential surface of a tubular member in a wave form. A circumferential surface of the tubular member 50 are shaped in a wave form in which a portion projecting in an outer radial direction and a portion dented in an inner radial direction are repeated alternately along the X axis direction. The corrugated tubular member is excellent in bendability compared to a tubular member having a smooth circumferential surface. The thickness of the circumferential surface of the tubular member 50 can be determined according to required bendability and durability. For example, the thickness of the circumferential surface of the tubular member 50 may be 0.2 mm to 0.5 mm.

The first covering part 100 covers the outside of the tubular member 50. In this example, the first covering part 100 directly covers the tubular member 50. The first covering part 100 forms a braided structure described later. The braided structure is a structure formed by combining and braiding string members.

Figure 3:
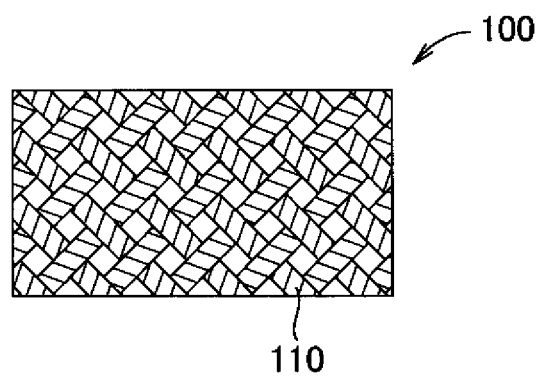
FIG. 3 is an enlarged view of a part of a first covering part enlarged.

FIG. 3 is an enlarged view of a part of the first covering part 100 enlarged. The braided structure in the first covering part 100 is formed by braiding multiple string members 110. The string member 110 has a structure in which a copper foil is wound spirally around a surface of a resin string member. The resin string member forming the string member 110 is a bundle of several tens of polyester threads having a string diameter of 20 to 30 μm. The copper foil forming the string member 110 is selected from a range of thickness of 20 to 30 μm and width of 0.3 to 1.0 mm. Copper has lower electric resistance than that of stainless steel. Winding the copper foil spirally around the resin string member prevents the copper from hindering the stretch in the axis direction of the string member 110. In this example, the copper foil wound around the string member 110 is tin-plated to have corrosion resistance and rust resistance. The electrical resistance in a tin is lower than that in a stainless steel. Accordingly, the electrical resistance of the copper foil is lower than that of stainless steel. In another example, the copper wound around the string member 110 may be individual copper body that is not tin-plated. In another example, the metal foil wound around the string member 110 may be an aluminum, a silver or the like.

In a state where the tube 10 is arranged in a home, it is assumed that a large current flow into the tube 10 due to spark discharge generated from induced lightning generated by lightning strike. In this example, in the tube 10, since the outside of the tubular member 50 is covered by the first covering part 100 including metal, spark discharge occurs not for the tubular member 50 having large electrical resistance but for the first covering part 100. Accordingly, damage in the tubular member 50 such as melting of a part of the circumferential surface of the tubular member 50 due to abnormal heat generation in the tubular member 50 having large electrical resistance due to spark discharge, can be prevented. The first covering part 100 has a braided structure using the string member 110, and has a position where the string members 110 are not in contact with each other. Therefore, compared to a configuration in which a covering part is formed of a metal layer having thickness continuing uniformly, the first covering part 100 has small conductive path for the amount of the position where the string members 110 are not in contact with each other. Therefore, even when a large current flow into the first covering part 100, a range of burning out due to the large current is hard to expand. In other words, in the first covering part 100, since multiple independent string members 110 are braided to form a mesh shape, there is a position where the string members 110 are not in contact with each other (discontinuous position). Since a current is hard to flow over the position where the string members are not in contact with each other, a range of burning out is hard to expand radially. Furthermore, all the string member 110 never be burned out at one time. Therefore, burning out the first covering part 100 over a wide range is hard to occur, compared to the configuration in which a range of burning out may expand radially and uniformly, for example, a configuration in which a covering part is formed of a metal layer having thickness continuing uniformly. From these factors, in the tube 10, it is possible to prevent burning out of a large part of the first covering part 100 due to spark discharge by a single induced lightning occurrence, and it is possible to maintain a function of releasing a large current to the ground not through the tubular member 50 for spark discharge due to multiple induced lightning occurrences.

Moreover, the first covering part 100 is formed of a braided structure using the string member 110, and is excellent in bendability and stretchability so that flexibility in the tube 10 is easy to be maintained as compared to the configuration in which a covering part is formed of a metal layer having thickness continuing uniformly. Furthermore, since the string member 110 is covered with a copper foil wound spirally around the string member 110, it is possible to prevent the copper covering the string member 110 from hindering the stretch in the axis direction of the string member 110. Accordingly, it is possible to prevent flexibility in the tube 10 from being hindered.

According to the first example described above, the first covering part 100 forming the braided structure can make the function of releasing a large current to the ground not through the tubular member for spark discharge due to induced lightning of plural times easy to be maintained, and can make the flexibility in the tube 10 easy to be maintained. Accordingly, maintaining of the function of releasing a large current to the ground not through the tubular member 50 for spark discharge due to induced lightning of plural times, and maintaining of the flexibility in the tube 10 can be both achieved. When spark discharge occurs from a steel frame or the like due to induced lightning for the tube 10 in the first example, the spark discharge occurs not toward the tubular member 50 but toward the first covering part 100. The current generated by the spark discharge flows not through the tubular member 50 but through the first covering part 100, is released to a side of a tube joint connected to the tube 10, and then, released to the ground via a ground electrode connected to the tube joint.

Furthermore, since the first covering part 100 has a braided structure, even when the thickness of the copper foil forming the string member 110 is increased, the flexibility in the tube 10 can be maintained. Therefore, improving of resistance against spark discharge in the tube 10 and maintaining of flexibility in the tube 10 can be both achieved. "Improving of resistance against spark discharge" here refers to improving the performance of releasing a large current to the ground not through the tubular member for spark discharge due to induced lightning. Furthermore, in the tube 10 in the first example, since the first covering part 100 has a braided structure using the string member 110. Accordingly, a cross-sectional area of a metal having lower electrical resistance than that of a metal forming the tubular member 50 can be made large in a cross section (cross section as shown in FIG. 2) taken along a plain perpendicular to a longitudinal direction of the covered tubular member, compared to the tube in which a covering part is formed of a metal layer having thickness continuing uniformly in the same thickness as that of the metal foil forming the string member 110. This is because the metal foil is not simply arranged to cover the outer circumference of the tubular member 50 in the tube 10, but wound spirally around the string member 110 forming the first covering part 100. With such a structure, the metal foil is arranged three dimensionally in the outer circumference of the tubular member 50 so that the cross-sectional area of a metal having lower electrical resistance than that of a metal forming the tubular member 50 is made larger in the cross section of the tube 10. The amount of current that can flow is proportional to the cross-sectional area of the metal having lower electrical resistance than that of the metal forming the tubular member in the cross section. Thus, in the tube 10 in the first example, as compared to the tube in which a covering part is formed by a metal layer having thickness continuing uniformly in the same thickness as that of the metal foil forming the string member 110, a large amount of current can flow. In other words, the tube 10 can endure current flowing of plural times until all metal foils are burned out.

B. Second Example

A tube in the second example is the same as the tube 10 in the first example except that the tube in the second example includes a second covering part (a second covering part 200 described later) instead of the first covering part 100. The second covering part is different from the first covering part 100 in the first example in a type (material) of the string member forming a braided structure.

Figure 4:
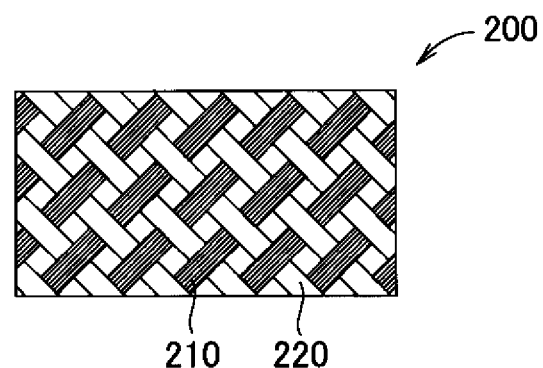
FIG. 4 is an enlarged view of a part of a second covering part enlarged.

FIG. 4 is an explanatory diagram showing a configuration of the second covering part 200 in the second example enlarged. In FIG. 4, as similar to FIG. 3, a part of the second covering part 200 is enlarged and shown. A braided structure in the second covering part 200 is a structure formed by using a string member 210 made of copper and a string member 220 made of resin. Specifically, as shown in FIG. 4, the braided structure is a structure in which the string member 210 and the string member 220 are braided to be arranged alternately. The copper string member 210 may be tin-plated to have corrosion resistance and rust resistance. With such a configuration, the second example has a similar effect to that of the first example. Furthermore, even when a ratio of the string member 210 among the string member 210 and the string member 220 forming the braided structure is increased, the flexibility in the tube can be maintained so that improving of resistance against spark discharge in the tube and maintaining of flexibility in the tube can be both achieved.

C. Third Example

Figure 5:
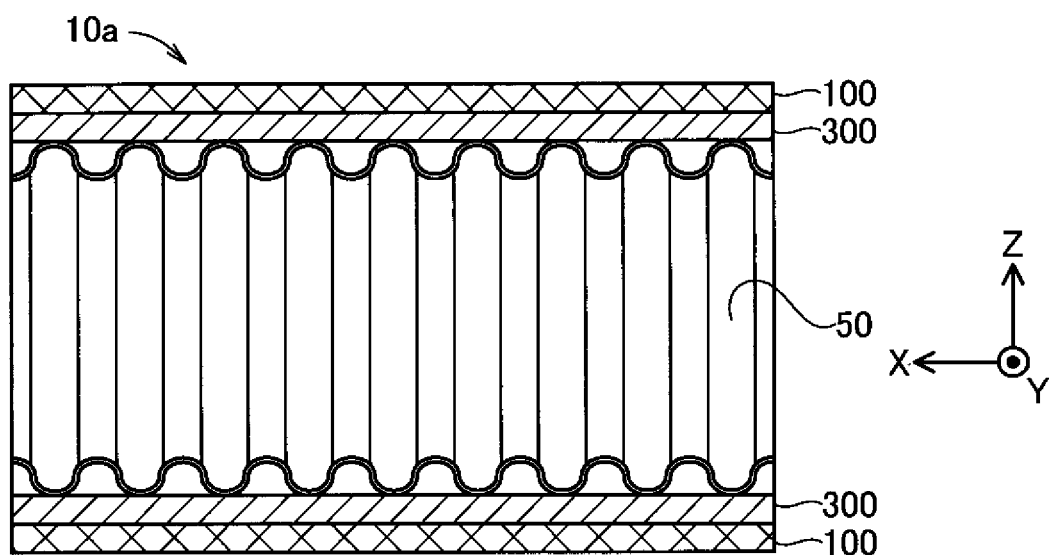
FIG. 5 is an explanatory diagram showing a configuration of a tube in a third example.

FIG. 5 is an explanatory diagram showing a configuration of a tube 10a in a third example. The tube 10a has the same configuration as the configuration of the tube 10 of the first example excluding that a third covering part 300 is provided between the tubular member 50 and the first covering part 100, and the same components are added with the same reference numerals and detailed description thereof is omitted.

The third covering part 300 is made of an insulating resin, and is a covering part directly covering the tubular member 50. In the first example, the first covering part 100 directly covers the tubular member 50. However, in the third example, the third covering part 300 directly covers the tubular member 50. In the third example, the first covering part 100 covers the third covering part 300. That is, the third covering part 300 is arranged between the tubular member 50 and the first covering part 100.

The tube 10a of the third example having the above configuration has a similar effect to that of the tube 10. Furthermore, since the resin third covering part 300 is arranged between the tubular member 50 and the first covering part 100, the tubular member 50 and a metal (copper and tin) portion in the first covering part 100 do not contact with each other so that the tubular member 50 and the first covering part 100 are electrically insulated. Accordingly, current flowing through the tubular member 50 via the first covering part 100 can be prevented.

D. Modification

D1. Modification 1

The tubular member 50 in the first example is formed of a stainless steel, but this disclosure is not limited thereto. For example, a tubular member in a tube of another example may be formed of a copper alloy such as brass or red brass, or an aluminum alloy.

D2. Modification 2

In the first example, the string member 110 is formed by winding the copper foil spirally around the resin string member, but this disclosure is not limited thereto. For example, the string member 110 may be formed by winding at least one or more copper foils along the circumferential direction of the resin string member. The string member 110 may be covered by covering by a copper a part of a surface of the resin string member, or may be covered by covering by a copper the entire surface of the resin string member. The string member 110 may be covered by any manner as long as at least a part of the string member 110 is covered by a copper. Furthermore, the string member 110 may be covered by any metal as long as the metal has lower electrical resistance than that of the metal forming the tubular member 50.

D3. Modification 3

The braided structure in the second covering part 200 of the second example is a structure formed by using the copper string member 210 and the resin string member 220, but this disclosure is not limited thereto. For example, in another example, a braided structure in the second covering part 200 may be a structure formed by using only the copper string member 210.

D4. Modification 4

The tube 10a of the third example includes the tubular member 50, the first covering part 100, and the third covering part 300, but this disclosure is not limited thereto. For example, a tube in another example may have a form of including the second covering part 200 instead of the first covering part 100 forming the tube 10a in the third example.

Our tubes are not limited to the configurations, examples, and modifications described above, and may be implemented by various configurations. For example, the examples corresponding to the technical features in each example described in the Summary, the examples, and the technical features in the modifications can be replaced or combined as appropriate to solve part or all of the above problem, or to achieve part or all of the above effect. Furthermore, as long as the technical feature is not described in the specification as essential, the technical feature may be deleted as appropriate.

What is claimed is:

1. A tube comprising:
   a corrugated metal tubular member; and
   a first covering part that covers an outside of the tubular member, and forms a braided structure using a resin string member of which at least a part is covered by a metal having a lower electrical resistance than an electrical resistance of a metal forming the tubular member,
   wherein the braided structure includes a first resin string member covered by a metal and a second resin string member not covered by a metal, and the first resin string member and the second resin string member are braided to be alternately arranged.

2. The tube according to claim 1, further comprising a third covering part made of an insulating resin arranged between the tubular member and the first covering part, and covers the tubular member,
   wherein the first covering part covers the third covering part.

3. The tube according to claim 2, wherein the string member in the first covering part is covered by winding a metal foil having a lower electrical resistance than an electrical resistance of a metal forming the tubular member.

4. The tube according to claim 1, wherein the string member in the first covering part is covered by winding a metal foil having a lower electrical resistance than an electrical resistance of a metal forming the tubular member.

5. A tube comprising:
   a corrugated metal tubular member; and
   a second covering part that covers an outside of the tubular member, and forms a braided structure using a metal string member having a lower electrical resistance than an electrical resistance of a metal forming the tubular member in at least a part of the braided structure,
   wherein the braided structure includes a resin string member and the metal string member, and the resin string member and the resin metal string member are braided to be arranged alternately.

6. The tube according to claim 5,
   further comprising a third covering part made of an insulating resin arranged between the tubular member and the second covering part, and covers the tubular member,
   wherein the second covering part covers the third covering part.

* * * * *